(12) United States Patent
Zimmann et al.

(10) Patent No.: US 10,493,879 B2
(45) Date of Patent: Dec. 3, 2019

(54) VENTILATED SEAT ELEMENT

(71) Applicant: Proprietect L.P., Toronto (CA)

(72) Inventors: Timo Zimmann, Reinheim (DE); Petr Janda, Nova Ves nad Nisou (CZ); Georg Heinl, Zwingenberg (DE)

(73) Assignee: PROPRIETECT L.P. (CA)

(*) Notice: Subject to any disclaimer, the term of this patent is extended or adjusted under 35 U.S.C. 154(b) by 66 days.

(21) Appl. No.: 14/650,232

(22) PCT Filed: Dec. 5, 2013

(86) PCT No.: PCT/CA2013/001006
§ 371 (c)(1),
(2) Date: Jun. 5, 2015

(87) PCT Pub. No.: WO2014/085907
PCT Pub. Date: Jun. 12, 2014

(65) Prior Publication Data
US 2015/0314716 A1    Nov. 5, 2015

Related U.S. Application Data

(60) Provisional application No. 61/733,660, filed on Dec. 5, 2012.

(51) Int. Cl.
*B60N 2/56*     (2006.01)
*B60N 2/70*     (2006.01)

(52) U.S. Cl.
CPC ......... *B60N 2/5664* (2013.01); *B60N 2/5642* (2013.01); *B60N 2/7017* (2013.01)

(58) Field of Classification Search
CPC ............................ B60N 2/5664; B60N 2/5642
(Continued)

(56) References Cited

U.S. PATENT DOCUMENTS 3,137,523 A * 6/1964 Karner .................... A47C 7/74
                                                            297/180.13
3,506,308 A    4/1970 Fenton
(Continued)

FOREIGN PATENT DOCUMENTS

DE        100 02 464 C1     8/2001
DE        102006054860 A1   5/2008
(Continued)

OTHER PUBLICATIONS

Office Action for Chinese Patent Application No. 201380072328.8 dated Jun. 29, 2018.

*Primary Examiner* — Milton Nelson, Jr.
(74) *Attorney, Agent, or Firm* — Katten Muchin Rosenman LLP

(57) ABSTRACT

In a preferred embodiment there is disclosed a vehicular seat element comprising a foam substrate, the foam substrate comprising an A-surface for contact by an occupant and a B-surface opposed to the A-surface, a central portion of the A-surface have a first surface area and comprising a plurality of channels, the central portion of the A-surface comprising an occupant contact portion having a second surface area, wherein the first surface area is greater than the second surface area, a plurality of apertures disposed in the plurality of channels, each aperture interconnecting the A-surface and the B-surface of the foam substrate. The plurality of channels acts a distribution manifold for air to be moved laterally with respect to the A-surface of the foam pad and also through the holes in the seat pad to allow for circulation of air. In other words, the through holes in the foam provide a pass for air to flow from the B-surface of the foam pad to the A-surface of the foam pad, and vice versa. This air flow is further promoted by compressing and decompressing of the foam by the mass of the occupant while the vehicle is in motion. This compression and decompression of the foam (Continued)

creates a so-called bellows effect to push or pull air through the vehicular seat. Ideally, the series of channels molded in the A-surface of the foam pad form a manifold that enhances air distribution by providing multiple paths for the air flow around (not just beneath) the occupant and through the seat.

22 Claims, 5 Drawing Sheets

(58) Field of Classification Search
USPC .................................. 297/452.46, 452.47
See application file for complete search history.

(56) References Cited

U.S. PATENT DOCUMENTS

| | | | |
|---|---|---|---|
| 3,770,318 A | | 11/1973 | Fenton |
| 4,313,640 A | * | 2/1982 | Trotman ................ A47C 7/742 |
| | | | 297/452.45 |
| 4,686,724 A | * | 8/1987 | Bedford ............ A61G 7/05707 |
| | | | 5/652.1 |
| 5,226,188 A | | 7/1993 | Liou |
| 5,403,065 A | | 4/1995 | Callerio |
| 7,070,232 B2 | | 7/2006 | Minegishi |
| 2006/0138811 A1 | | 5/2006 | Pfahler et al. |
| 2011/0169318 A1 | | 7/2011 | Lem et al. |
| 2011/0241404 A1 | | 10/2011 | Di Giusto et al. |

FOREIGN PATENT DOCUMENTS

| | | | | |
|---|---|---|---|---|
| EP | 0011816 A1 | * | 6/1980 | ............... A47C 7/40 |
| WO | 2006/102751 A1 | | 10/2006 | |

* cited by examiner

VENTILATED SEAT ELEMENT

CROSS-REFERENCE TO RELATED APPLICATION

The present application claims the benefit under 35 U.S.C. § 119(e) of provisional patent application Ser. No. 61/733,660, filed Dec. 5, 2012, the contents of which are hereby incorporated by reference.

BACKGROUND OF THE INVENTION

Field of the Invention

The present invention relates to a ventilated seat element. More particularly, the present invention relates to passive ventilated vehicular seat element.

Description of the Prior Art

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mould the polymer while it is forming and expanding.

One of the conventional ways to produce a polyurethane foam is known as the "one-shot" technique. In this technique, the isocyanate, a suitable polyol, a catalyst, water (which acts as a reactive "blowing" agent and can optionally be supplemented with one or more physical blowing agents) and other additives are mixed together at once using, for example, impingement mixing (e.g. high pressure). Generally, if one were to produce a polyurea, the polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixing technique.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with reactive groups (e.g. isocyanates). To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

As is known in the art, foamed isocyanate-based polymers are commonly used to produce parts used in vehicles. These include vehicular seats. A typical vehicular seat comprises a seat bottom and a seat back.

In recent years it has become conventional to employ ventilated seats in automobiles, particulary active ventilated seats.

In the production of an active ventilated seat, particularly one for use in an automobile, it is known in the art, for example, to incorporate heating elements in the seat which are then connected to a power supply and a control system to allow the occupant of the automobile to turn on or turn off the heating elements for occupant convenience in colder climates. In the past, this has been achieved by adhering to the seating element some form of resistant heating system.

This prior art approach is disadvantageous for a number of reasons.

First, since the heat provided from the heating element is somewhat localized, it must be used over substantially the entire surface of the seat which, in many cases, has a deleterious affect on the comfort properties of the seat.

Second, since the heating system is resistive, there is a risk that some of the heat emitted will penetrate the seat rather than emit the seat toward the occupant. This can lead to premature discolouration and wear of the seat component and, in certain circumstances, may present a safety risk. Alternatively, an intermediate projective layer between the heating element and the seat pad could be used, but this adds extra expense and weight to the seat.

Third, the prior system simply provides a heated seat which is of little use to an occupant who seeks improved convenience in a warmer climate.

Fourth, this prior system is not designed to address the humidity microclimate that exists between the occupant of the seat and the seat surface. This creates occupant discomfort regardless of the temperature control achieved using either prior art approach.

Another approach has involved molding into the seat element a conduit system that is connected to a motor that forces air, particularly heated and/or cooled air, through the conduit system. In some cases, the forced air temperature can be regulated to provide what is known in the art as a climate control seat.

Both of the prior art approaches described above add weight cost to the production of the vehicular seat. Further, given the heterogeneous composition of the vehicular seats made using these prior art approaches, recyclability becomes an increased challenge.

The prior art has attempted to address various of these problems by providing so-called passively ventilated vehicular seats.

For example, U.S. Pat. No. 7,070,232 [Minegishi et al. (Minegishi)] teaches a so-called breathable seat that comprises a seat foam body formed of urethane foam and a three-dimensional network cushion body incorporated in that region of the seat body which bears a user's body weight, a seat cover having breathability and a seat pan. The cushion body is formed from a large number of continuous linear elements of thermal plastic resin. The linear elements are looped windingly so that their respective contact portions are fused together. The seat body is formed having so-called venting holes that pass through the urethane foam in its thickness direction. The venting holes communicate with the cushion body and apertures of the pan frame. The seat cover envelopes the seat body and the cushion body. A disadvantage with the approach taught by Minegishi is that it requires the use of two separate elements to achieve the so-called breathable seat. Specifically, the urethane seat body must be configured to receive a cushion body which is not a foam material. This adds to the cost and complexity of producing a seat body and also suffers from the above-mentioned difficulties with recyclability of the seat body when it is discarded after use.

German patent DE100 02 464 C1 teaches a motor vehicle seat having a foamed core and at least one air duct extending in the core, an air-permeable seat cover, below which are air distribution layer is arranged made of material which is air permeable on all sides and with an air impermeable dividing layer between the foamed core and the air distribution layer. The core is foamed in situ and is encased on all sides by an air impermeable foam layer and the air duct is formed by inserting a core tube extending from the impermeable foam rear layer to the air impermeable front dividing layer. The seat described in this German patent publication suffers from the same difficulties as that described above for Minegishi, namely that the seat is expensive and complex to manufacture and is difficult to recycle after the product is discarded.

U.S. Pat. No. 5,226,188[Liou] teaches a ventilated foam cushion comprising a pad with an upper surface having a plurality of through holes a seat portion having a recess for receiving the pad, the seat portion having a plurality of ventilation holes. When a user sits on the cushion, the pad and the seat will be deformed thereby causing the air therein to eject upwardly to blow off heat evolved from the user. The problem with the approach in Liou is that an occupant of the seat will effectively block the through holes in the upper surface of the pad thereby effectively nullifying the circulatory effects depicted in the drawings of Liou. Thus, the temperature and humidity microclimate at the interface of the use and the upper surface of the cushion is not improved in an appreciable way. A further disadvantage of the approach in Liou is that is requires the presence of separate elements which must be combined to produce the cushion (i.e., the upper pad and the seat portion having a recess to receive the upper pad).

United States patent application publication number U.S. 2011/0169318 [Lem et al. (Lem)] teaches a passively air-conditioned motor vehicle seat comprising a breathable seat cover which has ventilation channels extending in the thickness direction. Each ventilation channel has at least one valve element for preventing the return flow of air in the direction from the B-surface of the seat to the A-surface of the seat. In a preferred embodiment, the valve element is constructed from the same material as the seat body. The approach in Lem suffers from the disadvantages as described above with respect to Liou, namely that the temperature and humidity microclimate at the interface of the seat occupant and the A-surface of the seat is not improved appreciably.

United States patent publication number U.S. 2011/0241404[Di Giusto et al. (Di Giusto)] teaches a vehicle supporting body having a padding which has a honeycomb body of elastic material and is covered with upholstery permeable to air and defining a user supporting surface. The cells of the honeycomb body extend along axis crosswise to the supporting surface and are open at the end. In use, there is a variance in volume of air in response to offsetting movement of the user on the seat supporting body. The seat supporting body comprises a number of connecting cells that are purportedly opened and closed automatically by valves in response to compression and decompression of the air in the cells—see FIGS. 2A-2D. The approach in Di Giusto suffers from the same disadvantages as described above with respect to Lem and Liou, namely that the temperature and humidity microclimate at the interface of the occupant of the seat and the A-surface of the seat is not improved appreciably. In addition, the approach in Di Giusto suffers from the disadvantages described above with respect to Minegishi, namely that the construction requires a number of heterogeneous elements which increases the cost and complexity of producing the seat and raises challenges with respect to recyclability.

Given all of the above disadvantages of the prior art, it would be desirable to have a passively ventilated seat element which is relatively inexpensive to produce and provides an improvement in the interface between the occupant of the ventilated seat element and the A-surface of that element. It would also be advantageous to have such a seat element which was relatively easy to recycle.

SUMMARY OF THE INVENTION

It is an object of the present invention to obviate or mitigate at least one of the above-mentioned disadvantages of the prior art.

It is another object of the present invention to provide a novel vehicular seat element.

It is another object of the present invention to provide a novel vehicular seat element that obviates or mitigates at least one of the above-mentioned disadvantages of the prior art.

Accordingly, in one of its aspects, the present invention provides a vehicular seat element comprising a foam subtstrate, the foam substrate comprising an A-surface for contact by an occupant and a B-surface opposed to the A-surface, a central portion of the A-surface have a first surface area and comprising a plurality of channels, the central portion of the A-surface comprising an occupant contact portion having a second surface area, wherein the first surface area is greater than the second surface area, a plurality of apertures disposed in the plurality of channels, each aperture interconnecting the A-surface and the B-surface of the foam substrate.

In another of its aspects, the present invention provides a A vehicular seat element comprising a foam subtstrate, the foam substrate comprising an A-surface for contact by an occupant and a B-surface opposed to the A-surface, a central portion of the A-surface have a first surface area and comprising an air manifold portion, the central portion of the A-surface comprising an occupant contact portion having a second surface area, wherein the first surface area is greater than the second surface area, a plurality of apertures disposed in the air manifold portion, each aperture interconnecting the A-surface and the B-surface of the foam substrate, the foam substrate configured to create a bellows effect of air in one or both of the air manifold potion when the occupant contact portion is successively compressed and de-compressed.

Thus, the present inventors have discovered a novel passively ventilated vehicular seat element which affords various improvements to the prior art discussed above. These improvements are proved from the provision of the combination of a plurality of channels in the A-surface of the seat element where the channels are coupled to one or more apertures that extend to the B-surface of the seat element. The channels extend an area of the A-surface which is larger than the contact area between the occupant of the seat and the A-surface. In other words, the channels extend beyond where a typical occupant would contact the A-surface of the seat element. By providing such an arrangement of channels in communication with apertures, the temperature and humidity microclimate is improved. This is achieved because air can be circulated along the A-surface of the seat element beyond the contact surface of the occupant of the seat and the A-surface of the seat element. This improves circulation and improves the temperature and humidity profile thereby improving comfort of the seat.

The precise nature of the channels is not particularly restricted provided that it allows for lateral movement of air with respect to the positioning of the apertures that connect the channels to the B-surface of the seat element. Thus, while a specific channel pattern which provides the improvements referred to above is set out in more detail below, it is to be understood that other channel patterns can be used. The point is the channel must provide the function of achieving lateral movement of air with respect to the A-surface of the seat element and the aperture that is connected to that channel and the B-surface of the seat element. For example, a number of suitable embodiments of channel patterns are set out in International Publication Number WO 2006/102751[San Miguel et al. (San Miguel)].

In a typical vehicular seat element, it is common to have side bolster portions on a opposed sides of the foam seat element and a central region for contact with the occupant. While it is preferred to dispose the channel pattern over substantially the entire central portion of the seat element, the main requirement is that the channel pattern be disposed in a central area of the A-surface that exceeds a predetermined area configured for normal contact with the occupant of the seat element. This ensures that air can be circulated beyond the area of contact between the occupant and the A-surface of the seat element.

Throughout this specification, reference is made to a "vehicular seat element". As used throughout the specification, this term is intended to cover both a vehicular seat cushion (the bottom portion of the seat) and a vehicular seat back (the back portion of a vehicular seat).

In a highly preferred embodiment of the present invention, the seat element is produced from an isocyanate-based polymer foam, more preferably a polyurethane foam, in which the channel pattern has been directly molded into a portion of the A-surface of the foam element. This facilitates production of the passively ventilated seat element and improves recyclability of the seat after it is discarded.

In a highly preferred embodiment of the present ventilated seat element, a molded polyurethane foam pad is produced in one process step. In other words, no post processing is required. The foam pad has a series of through holes that connect the bottom or B-surface of the foam pad with a top or a A-surface of the foam pad. The A-surface has a series of channels and a number of through holes disposed in the channels. A decorative trim cover is placed on top of the pad and is selected to have a medium to high level of permeability (e.g., fabric, perforated leather, etc.) in the region of the ventilation channels to allow for air flow to the occupant.

Notionally, the series of channels acts a distribution manifold for air to be moved laterally with respect to the A-surface of the foam pad and also through the holes in the seat pad to allow for circulation of air. In other words, the through holes in the foam provide a pass for air to flow from the B-surface of the foam pad to the A-surface of the foam pad, and vice versa. This air flow is further promoted by compressing and decompressing of the foam by the mass of the occupant while the vehicle is in motion. This compression and decompression of the foam creates a so-called bellows effect to push or pull air through the vehicular seat. Ideally, the series of channels molded in the A-surface of the foam pad form a manifold that enhances air distribution by providing multiple paths for the air flow around (not just beneath) the occupant and through the seat.

Advantageously, the above improvements can be achieved without significantly (or otherwise) affecting the comfort properties of the seat element.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
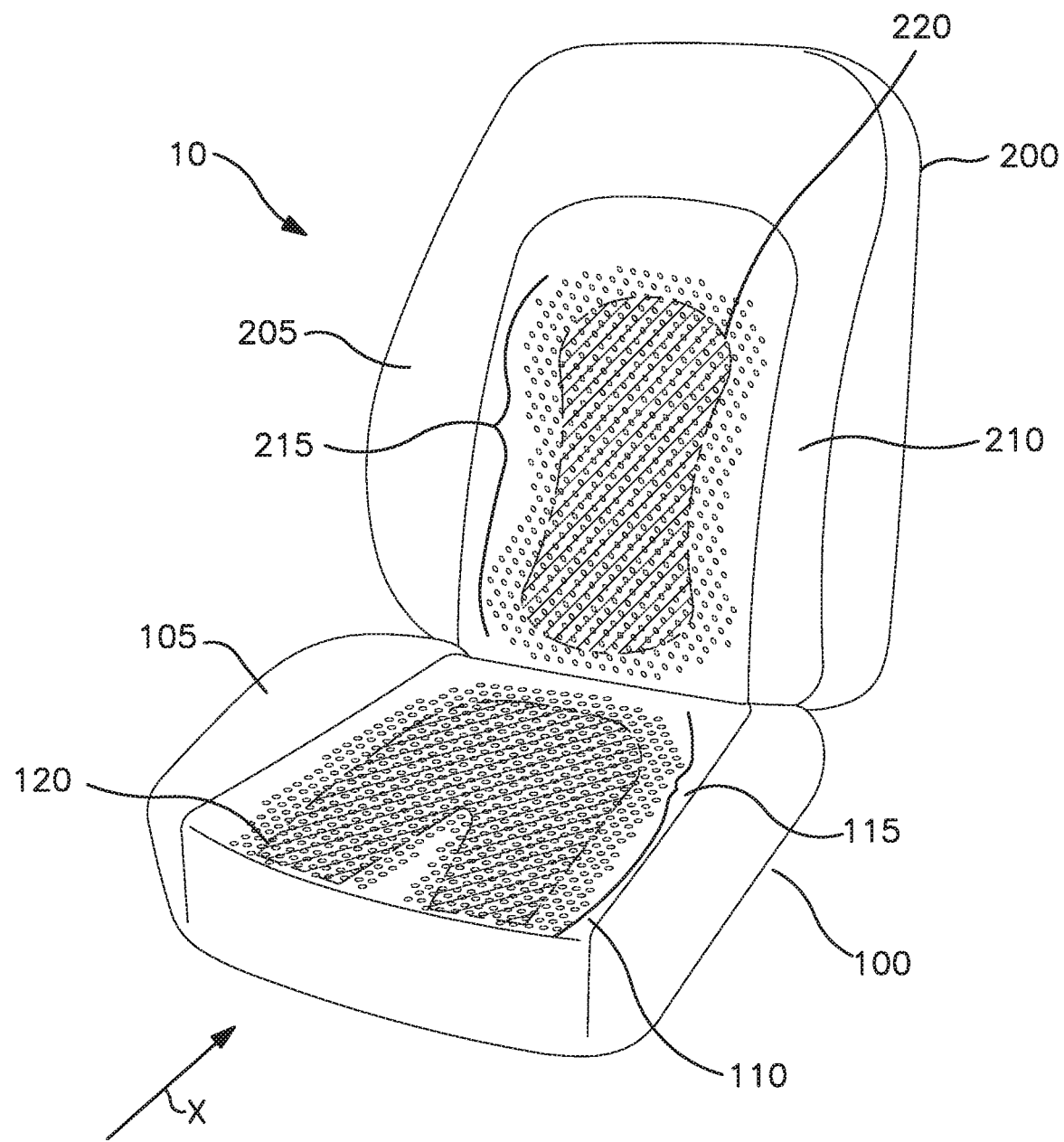
FIG. 1 illustrates a perspective view of a vehicular seat incorporating a preferred embodiment of the present ventilated seat element in the form of a vehicular seat back in combination with a vehicular seat cushion.
Figure 2:
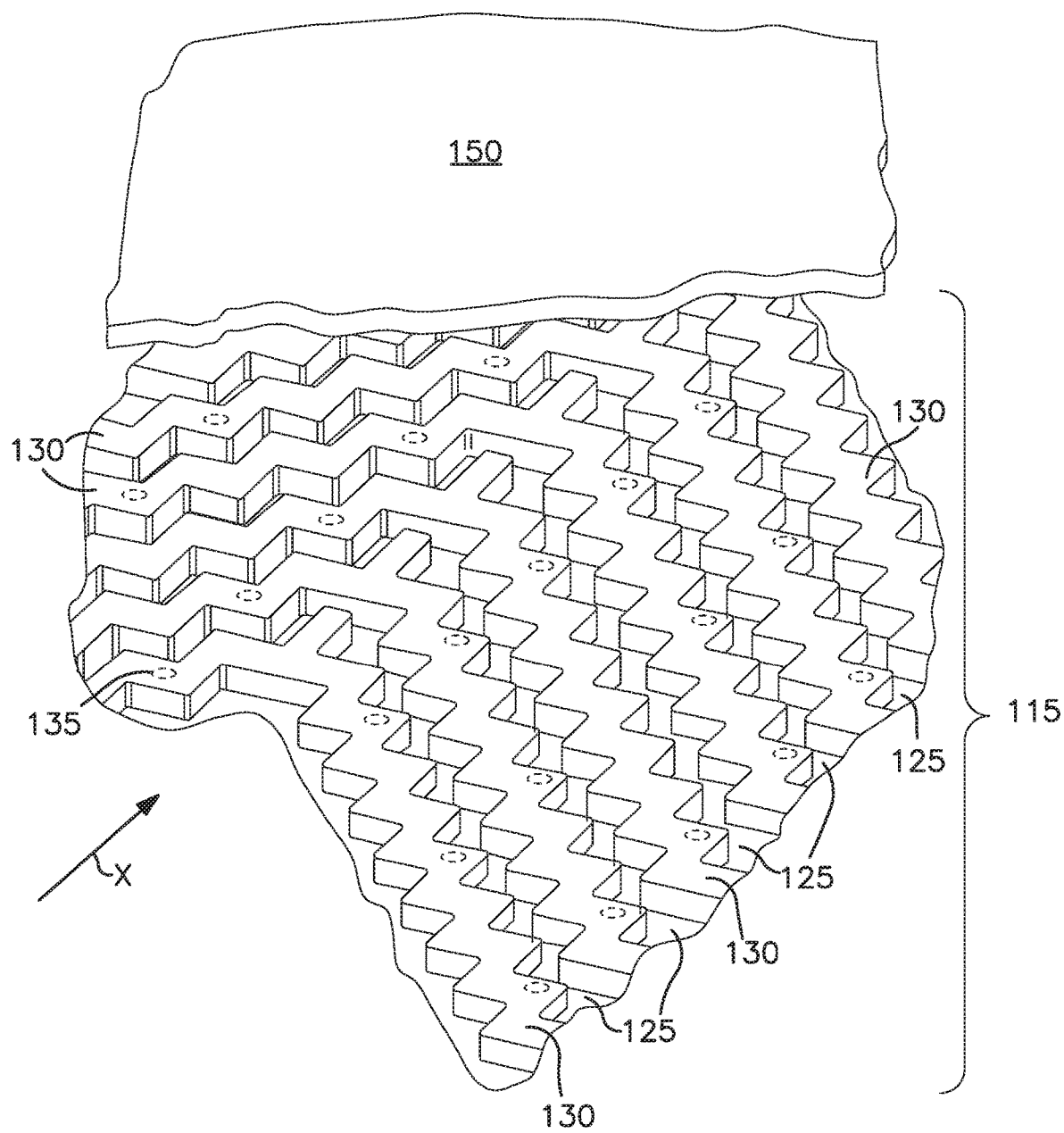
FIG. 2 illustrates an enlarged perspective view of a portion of a vehicular seat cushion illustrated in FIG. 1.
Figure 3:
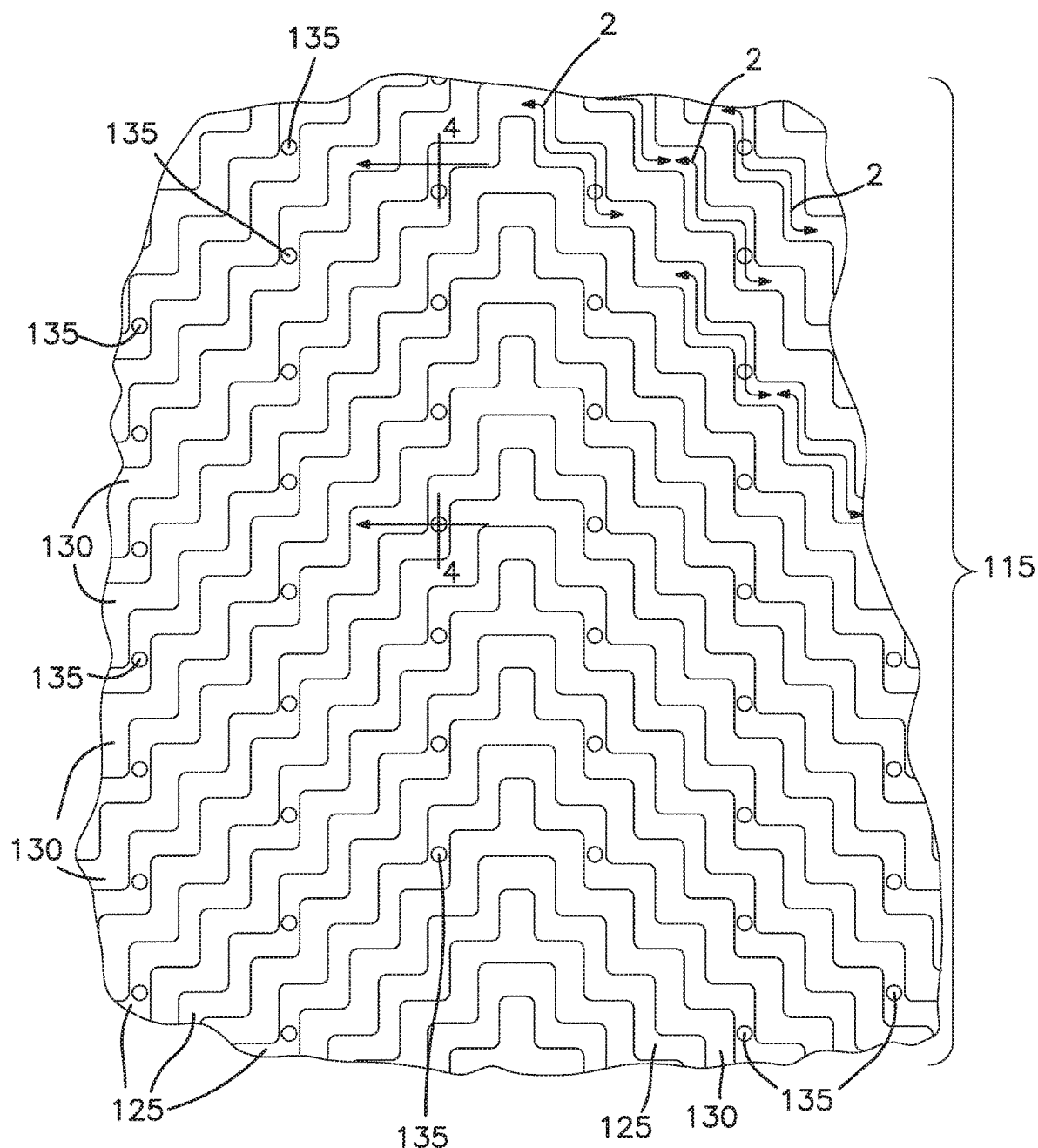
FIG. 3 illustrates a front elevation of a portion of the vehicular seat cushion illustrated in FIG. 1.
Figure 4:
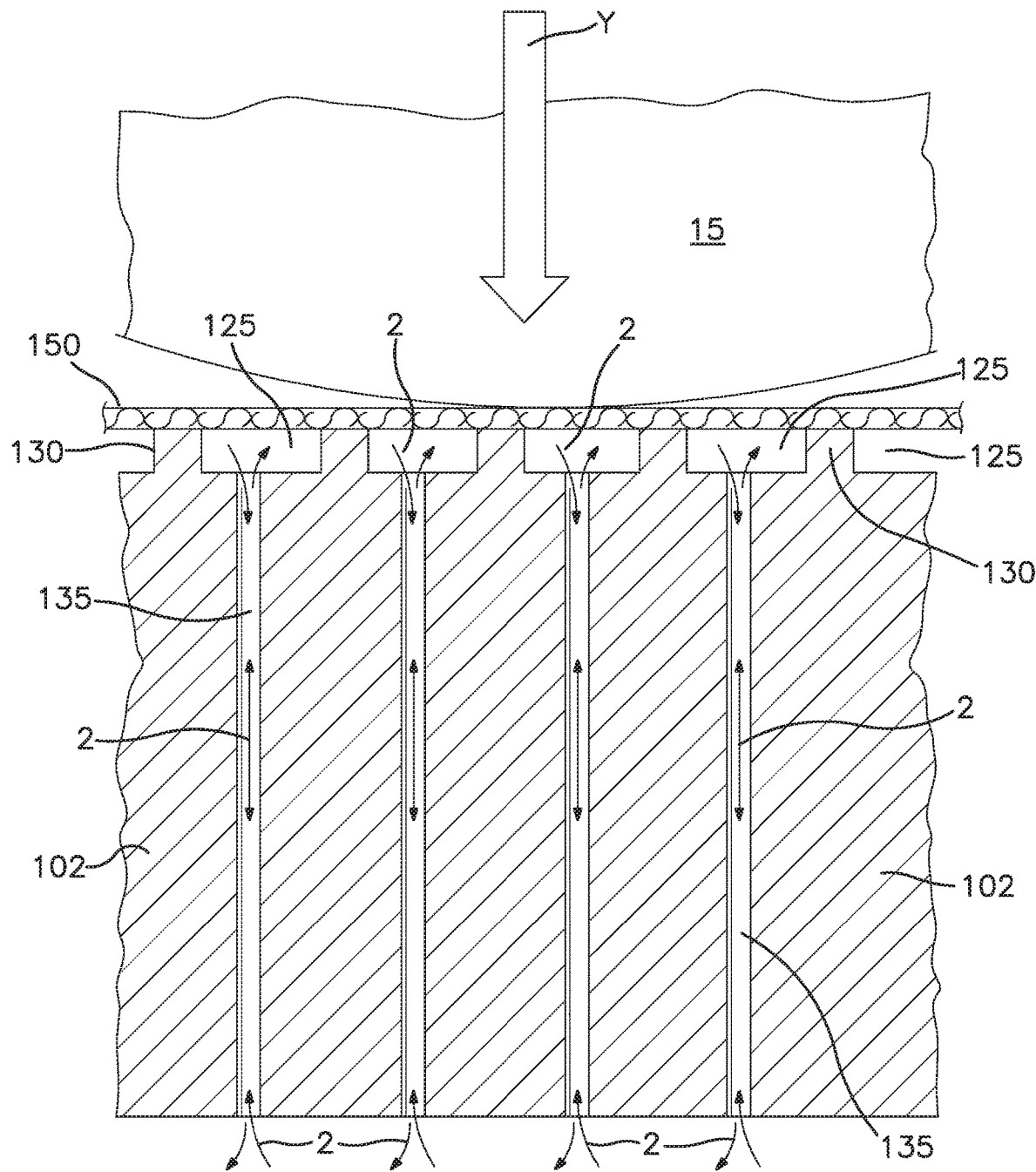
FIG. 4 illustrates a sectional view along the lines 4-4 in FIG. 3 with the additional inclusion of an occupant and a trim cover on the ventilated seat element.
Figure 5:
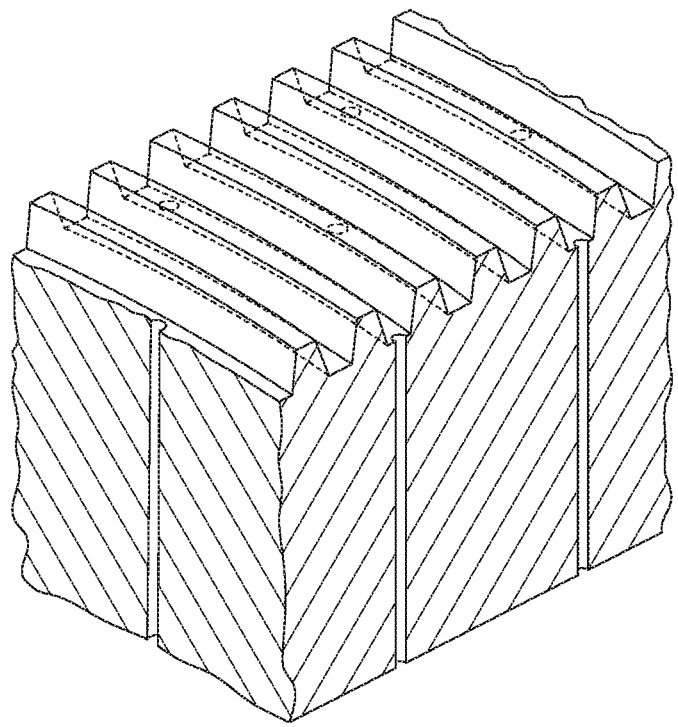
FIGS. 5 and 6 illustrate alternate embodiments of channel patterns that may be used in place of or in addition to the channel pattern illustrated in FIGS. 2 and 3.
Figure 6:
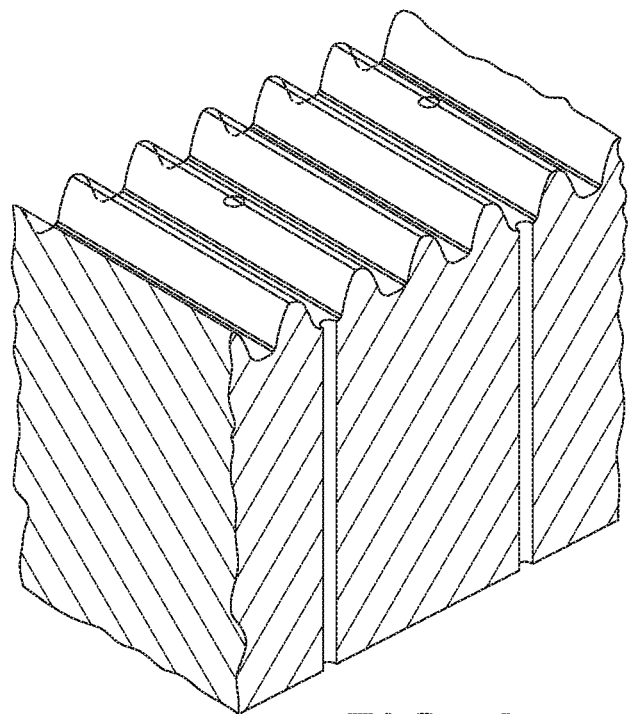

With reference to FIG. 1, there is illustrated a vehicular seat 10. Vehicular seat 10 comprises a seat cushion element 100 and a seat back element 200. For clarity, seat cushion element 100 and seat back element 200 are shown in FIG. 1 without a trim cover and without the channel pattern (the latter is shown in FIGS. 2-4) and discussed in more detail below.

Seat cushion element 100 comprises a pair of side bolsters 105,110. The A-surface of seat cushion element 100 comprises a central portion 115 containing a series of apertures (described in more detail below) that traverse from the A-surface of seat cushion element 100 to the B-surface.

Disposed within central portion 115 is a seating portion 120 shown in hatched outline. Seating portion 120 is designed to represent a portion of the A-surface of seat cushion element 100 intended for the occupant. The point is central portion 115 of the A-surface of seat cushion element 100 is larger than seating portion 120.

With reference to seat back element 200, similar elements appear with the same last two reference numerals as was discussed above for foam seat cushion 100.

With reference to FIG. 2, there is shown an enlarged perspective view of the section of portion 115. For added clarity, a portion of a trim cover 150 is shown covering a section of portion 115.

As shown, portion 115 comprises a series of channels 125 and ridge portions 130. Channels 125 are in a generally jagged or Z-shaped configuration. Disposed periodically in channels 125 are a series of apertures 135 which are shown ghosted as in FIG. 2 since they are obscured by ridges 130.

Arrow X in FIGS. 1 and 2 shows a orientation of channels 125 and ridges 130 with respect to vehicular seat 100—this is a preferred embodiment only and other relative orientations of channels 125 and ridges 130 are possible.

With reference to FIG. 3, there is a shown a front elevation of the section of portion 115 shown in FIG. 2. The placement of apertures 135 can be clearly seen in FIGS. 3.

With reference to FIG. 4, the main body of a foam element 102 comprising channels 125, ridges 130 and apertures 135 can be seen. Preferably, foam element 102 is made from polyurethane foam.

It is important to emphasize that, in a highly preferred embodiment of the present invention, channels 125, ridges 130 and apertures 135 are disposed in central portion 115 of seat cushion element 110 which extends beyond seating portion 120 that is adapted to contact the occupant. Thus, when an occupant 15 sits on a seat cushion element 100 a force is generated in the direction of arrow Y. As the vehicle containing vehicular seat 10 is in motion, movement of the occupant (even slight movement) will result in compression of foam element 102 in the direction of arrow Y and vice versa (i.e., decompression of foam element 102 in a direction opposite to arrow Y). This movement causes bellows effect such that air will travel bi-directionally according to arrows Z—see FIGS. 3 and 4.

By ensuring that the combination of channels 125 and ridges 130 extend in the A-surface of foam cushion element 100 beyond seation portion 120 (i.e., to the marginal regions of central portion 115), air movement is promoted bi-directionally as shown in FIGS. 3 and 4 throughout channels 125 and apertures 135. This results in improvements in breathability, humidity control, temperature control and the like of foam seat element 100.

Tests were conducted on three variations of representative seat element samples molded with polyurethane foam to compare their Breathability and Ventilation Rate per DIN EN 31 092 (02/94) or ISO 11 092 (10/93). The three variations consisted of representative seat elements with no modifications or a flat surface (comparative #1), a flat surface with only through holes connecting the A-surface and B-surface—i.e., no channel pattern in A-surface (comparative #2) and the seat element as illustrated FIG. 3, which includes channels, ridges and aperatures (invention). In all of the tests, the mass or indentor used had a contact surface area less than the surface area of the A-surface in which the combination of channels, ridges and aperatures was disposed in the seat element as illustrated in FIG. 3.

The Water Vapor Resistance or Breathability measurement of the seat elements was performed in a static and dynamic state. Under static load the addition of through holes to the seat element (comparative #2) improved breathability by 23 percent versus the flat surface sample (comparative #1). The use of a combination of channels, ridges and aperatures, as seen in FIG. 3 (invention), further increased the breathability performance versus the flat surface sample (comparative #1) by 58 percent. The dynamic test, which compresses and uncompresses the seat element samples to induce a bellows effect, demonstrated higher performance levels than the static. In this case the through holes (comparative #2) increased breathability by 68 percent (vs. comparative #1) and the combination of the channels ridges and aperatures (invention) exhibited an 88 percent increase (vs. comparative #1. The Ventilation Rate or the percent difference between the static and dynamic water vapor resistence represents the ventilation rate at the car seat component's surface. Fundemental tests have shown that a high ventilation rate is advantageous to a comfortable seat microclimate. The ventilation rate of the nonmodified surface was 11.5 (comparative #1), through holes increased the rate to 64 (comparative #2), and the addition of the channels, ridges, and aperatures yield the highest ventilation rate of 75 (invention).

These test results illustrate the advantages accruing from the provision in the A-surface have a combination of a channels/ridges and apertures (through-holes) in the channels disposed of over a larger surface are of the A-surface than the surface area typically in contact with the occupant of the vehicular seat.

Seat cushion element 100 and seat back element 200 may be produced using a conventional mold configured to provide a combination of channels 120 and ridges 130 (see, for example, San Miguel referred to above), and apertures 135 (see, for example, German patent DE 100 02 464 C1).

With reference to Paragraphs 5 and 6, there are shown alternate versions of channels and ridges that may be used in combination with or in substitution for channels 125 and ridges 130 illustrated in FIGS. 2-4.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A vehicular seat element comprising a foam substrate, the foam substrate comprising an A-surface for contact by an occupant and a B-surface opposed to the A-surface, a central portion of the A-surface having a first surface area and comprising a plurality of channels, the central portion of the A-surface comprising an occupant contact portion having a second surface area, wherein the first surface area is greater than and encompasses the second surface area, a plurality of apertures disposed in each of the plurality of channels, each aperture interconnecting the A-surface and the B-surface of the foam substrate and configured such that: (i) air will travel bi-directionally into and out of opposed ends of the aperture, and (ii) the combination of the plurality of channels and the plurality of apertures disposed in each channel provides multiple paths for the air flow: (a) around, not just beneath, an occupant and through the seat element, and (b) from the occupant contact portion to a marginal region of the central portion of the A-surface, at least some of the plurality of channels configured to extend from the first surface area to at least one portion of the A-surface that is non-overlapping with the second surface area.

2. The vehicular seat element defined in claim 1, wherein the vehicular seat element is in the form of a vehicular seat cushion.

3. The vehicular seat element defined in claim 1, wherein the vehicular seat element is in the form of a vehicular seatback.

4. The vehicular seat element defined in claim 1, further comprising a trim cover element substantially covering the A-surface of the foam substrate.

5. The vehicular seat element defined in claim 1, wherein the plurality of apertures is disposed in channels disposed in the second surface area.

6. The vehicular seat element defined in claim 1, wherein the plurality of apertures is disposed in channels disposed in the first surface area and the second surface area.

7. The vehicular seat element defined in claim 1, wherein the foam substrate is a unitary molded polyurethane foam substrate.

8. The vehicular seat element defined in claim 1, wherein the first surface area is from about 15% to about 30% greater than the second surface area.

9. The vehicular seat element defined in claim 1, wherein the first surface area is from about 15% to about 25% greater than the second surface area.

10. The vehicular seat element defined in claim 1, wherein each channel has a saw-tooth configuration.

11. The vehicular seat element defined in claim 1, wherein the plurality of apertures is disposed in channels disposed in the first surface area.

12. A vehicular seat element comprising a foam substrate, the foam substrate comprising an A-surface for contact by an occupant and a B-surface opposed to the A-surface, a central portion of the A-surface having a first surface area and comprising an air manifold portion comprising a plurality of channels, the central portion of the A-surface comprising an occupant contact portion having a second surface area, wherein the first surface area is greater than and encompassing the second surface area, a plurality of apertures disposed in each channel in the air manifold portion, each aperture interconnecting the A-surface and the B-surface of the foam substrate and configured such that air will travel bi-directionally into and out of opposed ends of the aperture, the foam substrate configured to create a bellows effect of air in the air manifold portion when the occupant contact portion is successively compressed and de-compressed, the combination of the plurality of channels and the plurality of apertures disposed in each channel configured to provide multiple paths for the air flow: (a) around, not just beneath, an occupant and through the seat element, and (b) from the occupant contact portion to a marginal region of the central portion of the A-surface, at least some of the plurality of channels configured to extend from the first surface area to at least one portion of the A-surface that is non-overlapping with the second surface area.

13. The vehicular seat element defined in claim 12, wherein the vehicular seat element is in the form of a vehicular seat cushion.

14. The vehicular seat element defined in claim 12, wherein the vehicular seat element is in the form of a vehicular seatback.

15. The vehicular seat element defined in claim 12, further comprising a trim cover element substantially covering the A-surface of the foam substrate.

16. The vehicular seat element defined in claim 12, wherein the foam substrate is a unitary molded polyurethane foam substrate.

17. The vehicular seat element defined in claim 12, wherein the first surface area is from about 15% to about 30% greater than the second surface area.

18. The vehicular seat element defined in claim 12, wherein the first surface area is from about 15% to about 25% greater than the second surface area.

19. The vehicular seat element defined in claim 12, wherein the air manifold portion comprises a plurality of channels and each channel has a saw-tooth configuration.

20. The vehicular seat element defined in claim 12, wherein plurality of apertures is disposed in the first surface area.

21. The vehicular seat element defined in claim 12, wherein plurality of apertures is disposed in channels disposed in the second surface area.

22. The vehicular seat element defined in claim 12, wherein the plurality of apertures is disposed in a plurality of channels disposed in the first surface area and the second surface area.

* * * * *